Nov. 15, 1960   J. W. LIPSCOMB   2,960,379
METHOD AND APPARATUS FOR SEISMIC PROSPECTING
Filed Nov. 9, 1956   5 Sheets-Sheet 5
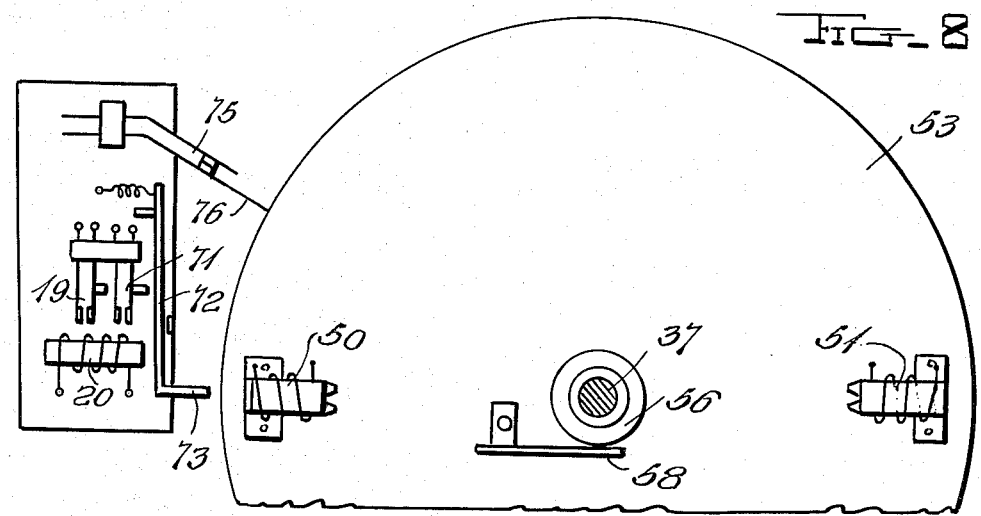
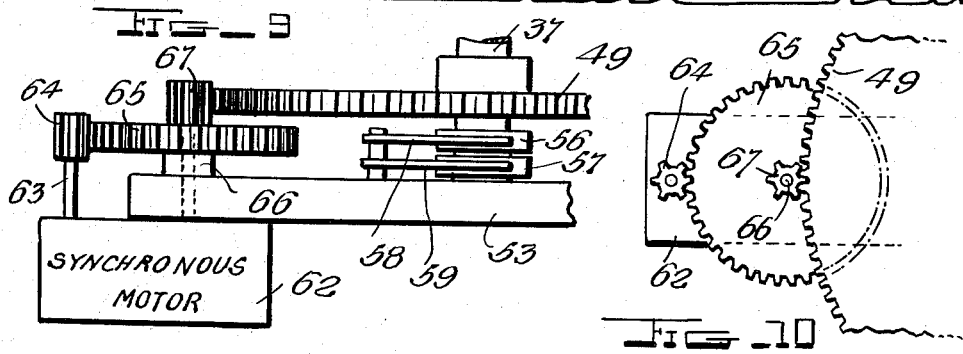
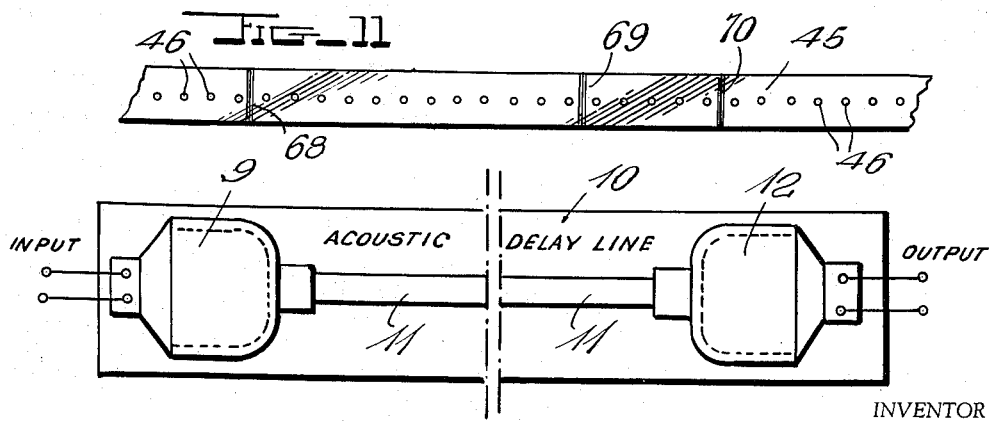
INVENTOR
John Wilson Lipscomb,
BY
John B. Brady
ATTORNEY

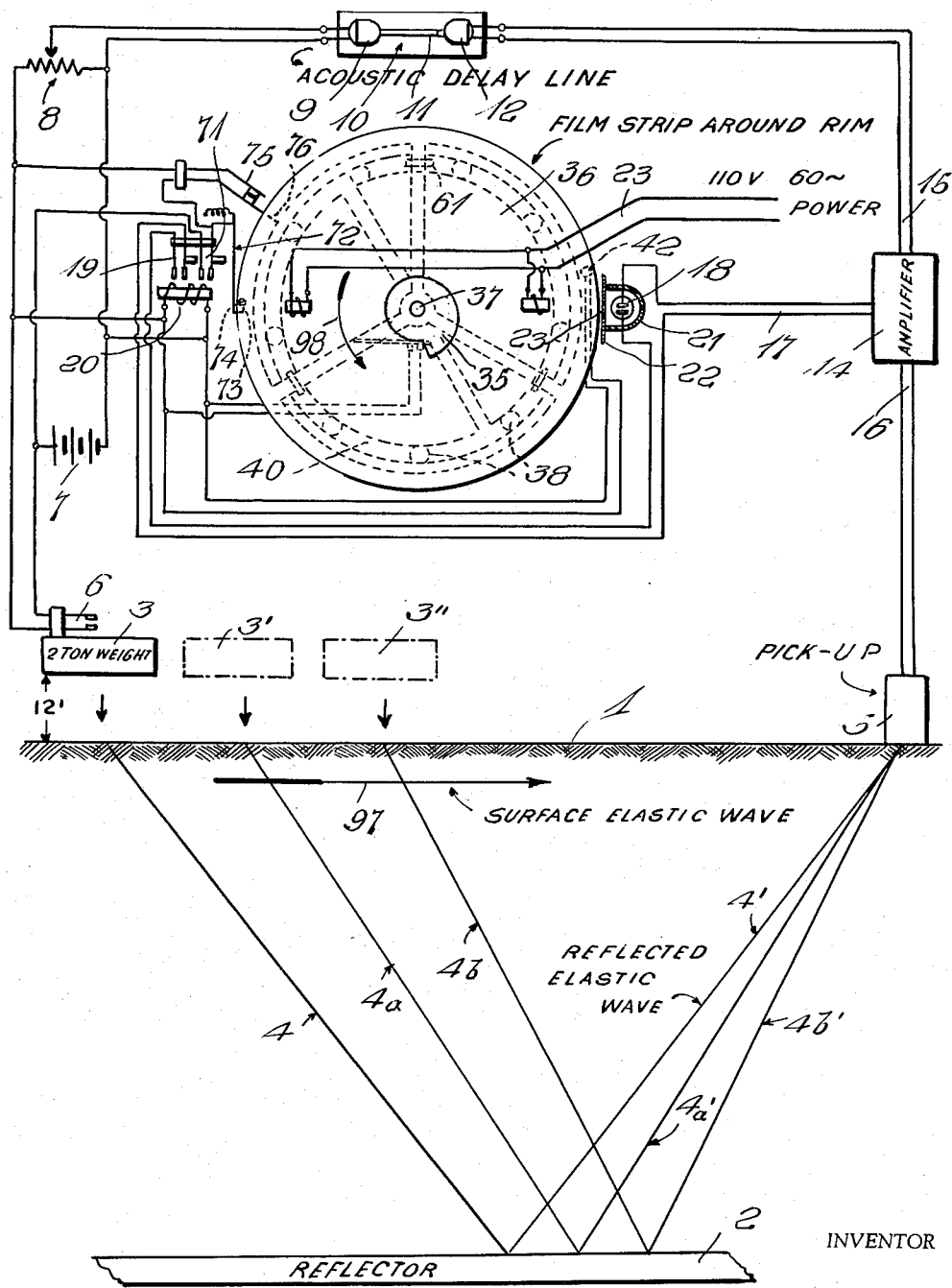

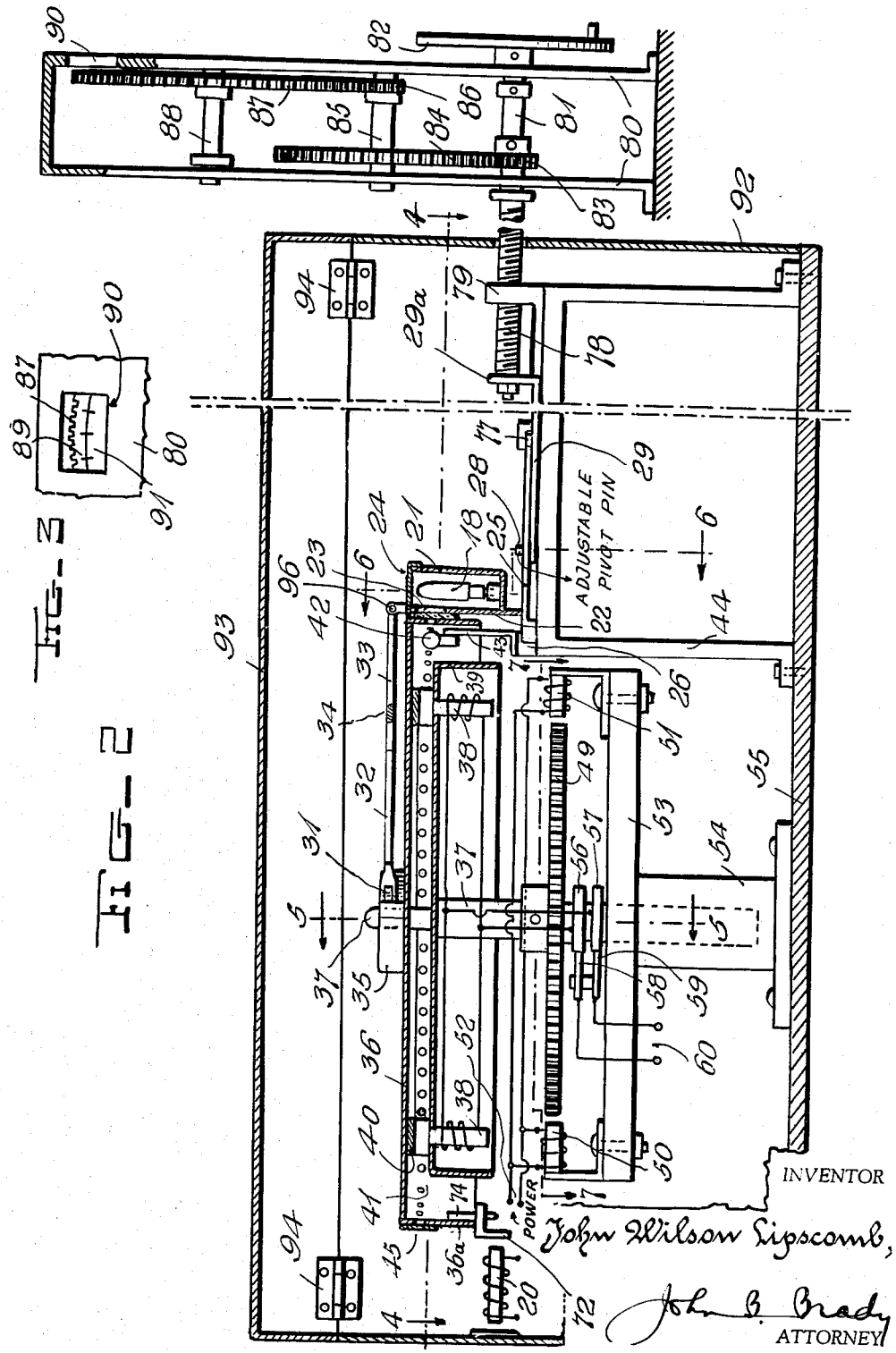

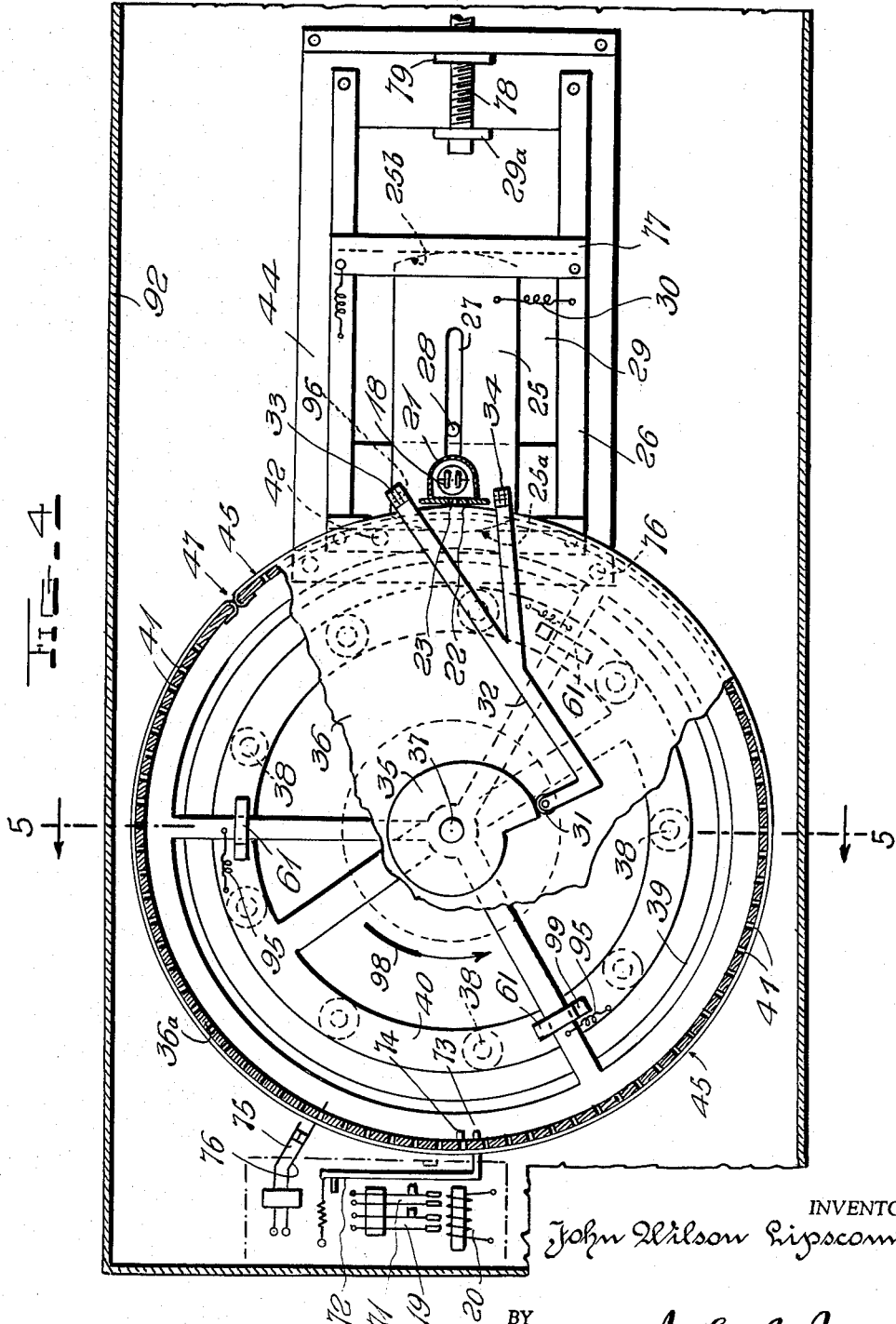

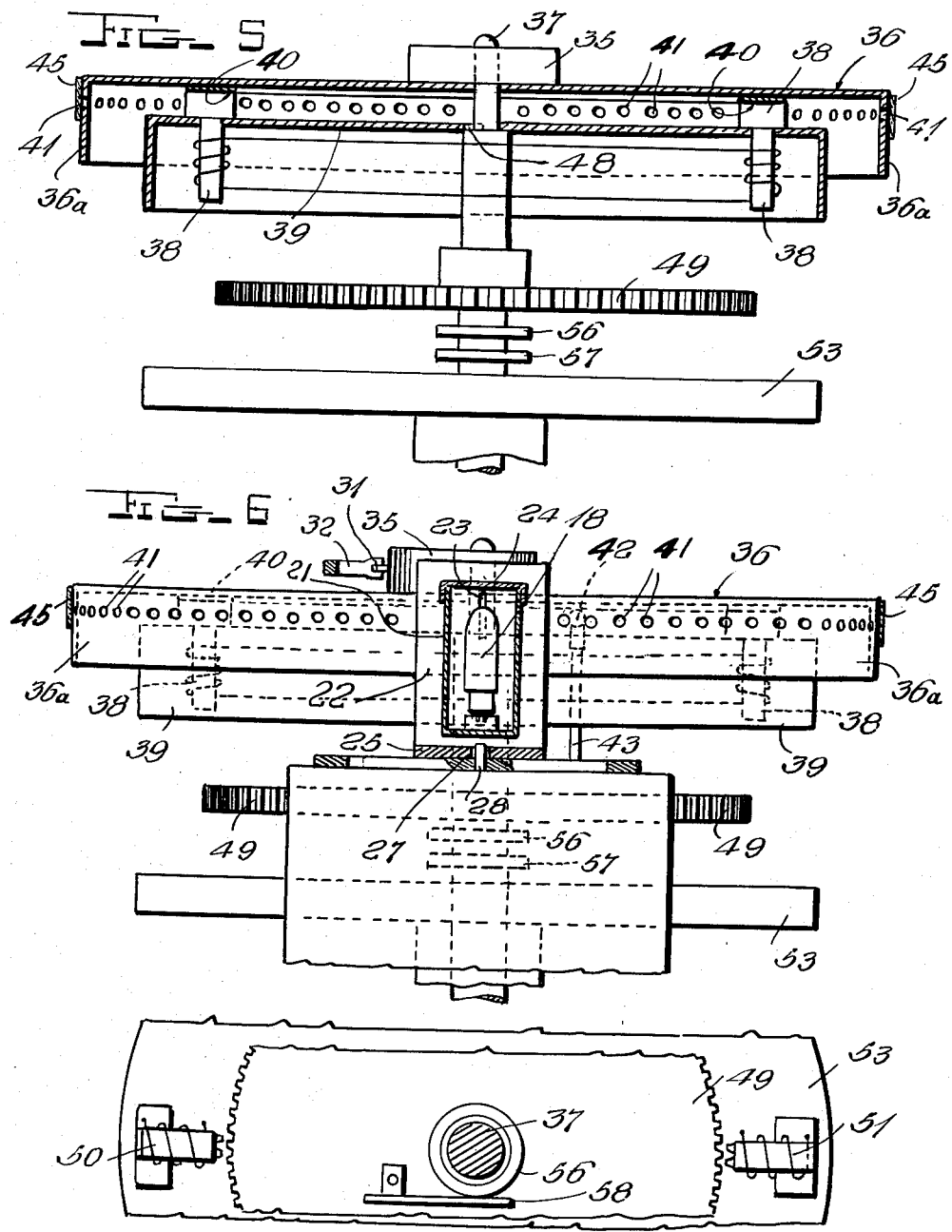

United States Patent Office 2,960,379
Patented Nov. 15, 1960

2,960,379

METHOD AND APPARATUS FOR SEISMIC PROSPECTING

John Wilson Lipscomb, 2775 Morning Glory, Baton Rouge, La.

Filed Nov. 9, 1956, Ser. No. 621,253

9 Claims. (Cl. 346—107)

My invention relates broadly to photographic recording and more particularly to a method and apparatus for seismic recording for determining the character of deposits in the earth by survey conducted over the surface of the earth.

One of the objects of my invention is to provide a construction of photographic recorder which is sensitive and efficient in determining the character of hidden deposits in the earth including means for registering the travel of shock waves through progressive areas of the terrain under investigation.

Another object of my invention is to provide a construction of readily portable camera for making photographic records of the travel of shock waves through the earth and the time of travel thereof for enabling a determination to be made respecting the hidden deposits in the earth.

Another object of my invention is to provide a method of photographically recording the travel of shock waves through the earth progressively over the area of the earth under investigation for producing a record which will visually indicate the character of hidden deposits beneath the terrain.

Still another object of my invention is to provide a construction of readily portable camera which may be mounted upon a mobile unit adapted to be driven over an area to be surveyed and wherein the camera will produce photographic reproductions of the travel of shock or elastic waves through the earth thereby providing data from which deductions may be made of the character of the hidden deposits beneath the earth.

A still further object of my invention is to provide a construction of portable mobile camera for photographically recording conditions existing beneath the surface of the earth over periodic timed sequences including means for scanning the photographic record in relation to the periodic timed sequences recorded on the film for effecting a record of the reflection paths of shock waves which are initiated in timed relation to the operation of the camera.

Another object of my invention is to provide a photographic recorder for seismic prospecting having corrective means associated therewith for correcting for earth wave reflections initiated upon release of the shock producing means in a wave propagating system.

Still another object of my invention is to provide a seismic prospecting method in which corrections can be made for known conditions in the subsurface of the earth under investigation in order that the unknown conditions of the subsurface of the earth may be recorded and analyzed for determining the character and extent of the unknown bodies in the earth.

Other and further objects of my invention reside in a camera assembly including a film driving mechanism and means for producing both a regularly timed photographic record and a scanned record relative to the regularly timed record where the scanned record is dependent upon the travel of elastic or shock waves through the earth for indicating by such scanned record the character of hidden deposits in the earth as set forth more fully in the specification hereinafter following by reference to the accompanying drawings, in which:

Fig. 1 is a schematic and diagrammatic view of the photographic recorder of my invention shown in association with the shock producing and vibration measuring equipment used in the system of my invention;

Fig. 2 is a longitudinal sectional view through a fragmentary portion of the photographic recorder of my invention, the view being broken away at one end and foreshortened adjacent the other end to enable the component parts to be illustrated on a sufficiently large scale to make the invention clear;

Fig. 3 is a fragmentary front elevational view of the scale associated with the setting mechanism of the photographic recorder of Fig. 2;

Fig. 4 is a horizontal sectional view taken substantially on line 4—4 of Fig. 2 and showing the photographic recorder case in horizontal section and the film carriage in top plan view with portions of the film carriage being broken away at diametrically opposite sides and illustrating the timing apertures therein and the manner of fastening the film strip around the film carriage, the light slit for the gaseous discharge lamp which effects the recording of shock pulses on the film being illustrated in horizontal section and the scanning mechanism being shown in normal position preparatory to a scanning movement;

Fig. 5 is a transverse sectional view taken substantially on line 5—5 of Figs. 2 and 4;

Fig. 6 is a fragmentary vertical sectional view taken on line 6—6 of Fig. 2 and showing the relationship of the scanning mechanism to the film carriage;

Fig. 7 is a fragmentary horizontal sectional view taken substantially on line 7—7 of Fig. 2;

Fig. 8 is a fragmentary top view of the base of the recorder drive mechanism with the turntable and gear removed;

Fig. 9 is a fragmentary side elevational view showing a modified form of drive for the photographic recorder utilizing a driving motor;

Fig. 10 is a fragmentary plan view of the modified form of drive mechanism shown in Fig. 9;

Fig. 11 is a fragmentary view of a portion of the film record which is made on the photographic recorder of my invention; and Fig. 12 is an enlarged schematic view of the acoustic delay line used in the camera system of my invention.

My invention is directed to a method and apparatus for seismic exploration and a determination of the character of hidden deposits in the earth. I provide a construction of portable mobile camera unit which is readily mounted upon a vehicle equipped with a weight dropping mechanism enabling a large mass to be released for gravitationally striking the earth and setting up elastic reverberations therein adapted to penetrate the earth to the hidden reflective surface constituting the deposits and to be reflected thereby to a vibratory pickup device at the earth's surface. The vehicle which carries the photographic recorder, and the weight dropping mechanism, is moved over the terrain with reference to the vibratory pickup device. The pickup device may be in the nature of a microphone or inductor sensitive to shock vibration. Connections of the pickup with the photographic recorder on the mobile unit may be made by the unwinding of a cable on a cable reel or drum as the vehicle carrying the camera and weight moves progressively relative to the pickup position. I may provide a radio transmitter at the pickup position capable of emitting radio signals representative of the shock vibrations incident upon the pickup device. Such radio signals are received upon the vehicle and control the operation of the circuit of the photographic recorder. Where this extendible cable interconnects the pickup device with the photographic recorder, connections are made to the input circuit of an amplifier associated with the photographic recorder. The amplifier is provided with a second input circuit which is connected to the output of an acoustic time delay line which is controlled in accordance with the operation of the weight releasing mechanism. The output of the amplifier compositely controlled from the vibratory pickup device and in accordance with the operation of the weight releasing mechanism connects to a recording light operative to effect recordings upon a light sensitive film which is revolved in the path of the recording lamp and associated light slit. The mounting for the recording lamp and light slit is adjustable to enable the lamp and light slit to be oriented as a unit for correcting the system according to known characters of the reflected waves in the area under investigation. Provision is made for mounting the light sensitive film on a carrier which may be in the nature of a cylindrical drum and which is perforated at equally spaced intervals in a row of perforations which registers time reference markers on the film with a recording lamp. A weight release mechanism is provided and the control therefore is associated with means for energizing the circuit to the recording lamp. Upon release of the weight mechanism and the establishment of shock waves in the area of the earth under investigation the timing markers are periodically recorded on the film and the vibratory energy from the reflected waves through the earth utilized to control the amplifier and the first mentioned recording lamp for effecting recordings on the film in relation to the timing markers recorded thereon which will visually show the character of the terrain and the obscured objects therein by transverse lines recorded on the film. A time delay device is provided and which is initiated upon operation at the time of actuation of the weight release mechanism for combining the timing record of the weight release with the timing record of the received reflected waves for thus obtaining by the composite record on the film an accurate interpretation of the characteristics of the subsurface of the earth over which the measurements are taken.

I have found the apparatus of my invention efficient and accurate in operation. While I have described herein certain preferred embodiments of the invention I realize that modifications may be made and I desire that the disclosure herein be considered in the illustrative sense and not in the limiting sense.

Referring to the drawings in more detail, reference character 1 designates the surface of the terrain of the earth beneath which the hidden body 2 is to be detected and the magnitude thereof determined.

In Fig. 1, I have illustrated the arrangement of the two-ton weight 3 which may be carried by a vehicle and dropped to a distance of approximately twelve feet to propagate pressure waves in the earth which extend through a path indicated at 4 and strike the embedded body 2 and rebound as reflected pressure waves 4' to actuate the pickup or pressure wave responsive device located at the surface of the earth in the position 5.

My invention contemplates the movement of the camera and recording equipment by the same vehicle which supports the weight dropping mechanism so that the weight when retrieved may be successively dropped from the positions 3' or 3'' for correspondingly producing successive pressure wave propagations along the paths 4a which rebound along the path 4a' for actuating the pickup device 5 or which are subsequently propagated along the path 4b and which rebound along the path 4b' and actuate the pickup device 5. It will be understood that the pickup station may be shifted for subsequent weight dropping operations, but for purposes of explaining the principles of my invention it is sufficient to point out that the moving vehicle upon which the recording equipment of my invention is installed is equipped to successively drop a mass for producing compressional waves in the earth which, when reflected by an intervening body beneath the earth's surface, provide identifying characteristic data, revealing the identity and character of the hidden body. As the weight is dropped a circuit is closed at contacts 6 to produce an electrical impulse. This initial electrical impulse is compared with impulses produced by the reflected elastic waves 4', 4a' and 4b' incident upon the pickup 5 for effecting a composite recording on the film recorder of my invention.

The source of electric potential represented at 7 is connected through contacts 6 and the volume control potentiometer 8 to the input of the electromagnetic sound reproducer 9 of the acoustic delay line 10. The acoustic delay line 10 comprises the input electromagnetic sound reproducer 9, approximately 55 feet of flexible coiled delay hose 11 and an output electromagnetic device 12 serving as an inductor generator and leading to one input circuit of electron tube amplifier 14. The electron tube amplifier 14 has two input circuits, that is, the input circuit 15 to which the output of the inductor 12 of the acoustic delay line 10 is connected and the input circuit 16 which is connected to the microphonic or inductor type pickup 5 which responds to the reflected elastic waves 4', 4a' and 4b', as represented in Fig. 1. The output of electron tube amplifier 14 is represented at 17 connected to the gaseous discharge tube, such as neon lamp 18 through the contacts 19 of the relay 20. The neon lamp 18 is mounted within a lamp housing 21 across the front of which the plate 22 extends containing the light slit 23. The lamp housing 21 is closed by a cover member 24 so that there is no disemination of light rays from neon tube 18 rearwardly and the light from neon tube 18 is directed through the light slit 23. The plate 22 which supports the lamp housing 21 extends vertically from a base plate 25 which is supported for horizontal oscillatory movement within the confining frame 26. The plate 25 is curved or rounded on each end thereof at 25a and 25b and is provided with a central longitudinally extending slot 27 through which the adjustable pivot pin 28 carried by the horizontally movable plate 29 projects. The base plate 25 is biased by means of coil spring 30 so that the plate normally tends to twist clockwise about adjustable pivot pin 28 in order to maintain a roller member 31 carried by the end of lever arm 32 which is supported by the Y-shaped bracket arms 33 and 34 extending vertically from the base plate 25 in contact with the surface of the revolvable cam 35. Lever arm 32 and Y-shaped bracket arms 33 and 34 may be raised on hinges 96 to permit removal and replacement of film carriage 36 and associated cam 35.

The cam 35 is carried by the film carriage 36 which is revolved about shaft 37 by means of electromagnets 38 carried by the constant speed turntable shown at 39. As weight 3 is dropped and contacts 6 close by inertia at impact the electromagnets 38 grip the circular ring of magnetic material 40 on the underside of the film carriage 36 for revolving the film carriage 36. The magnetic ring 40 is secured to the spoked portions of the film carriage 36 by transverse strips 61 and springs 95 which act to lessen the effect of starting inertia of film carriage 36. The film carriage 36 is extremely light in weight and is in the form of a spoked inverted pan pressed from sheet aluminum or other suitable material and has a depending skirt 36a having an annular row of timing perforations 41 which register during the rotation of the film carriage 36 with a timing light of incandescent characteristic shown at 42 mounted on bracket 43 supported on base structure 44. The timing light 42 is mounted off the longitudinal center line through the film carriage 36 as shown more clearly in Figs. 1, 4 and 6 and is energized from the source of potential 7 when contacts 6 are closed at the time of release of the weight 3 and simultaneously with the energization of relay operating winding 20. The timing light 42, when energized, directs light rays from inside the film carriage 36 through the apertures 41 onto the light sensitive film 45 carried by the film carriage. The light sensitive film 45 is a film band or strip having a length of approximately 39 inches for a film carriage 36 having a diameter of twelve inches. The width of the film strip 45 is one-half inch and is located on the rim of the film carriage which is 37.69 inches in circumference so that light rays are incident thereon through the perforations 41 for establishing a record with reference time intervals or markers as illustrated in Fig. 11, at 46. The film strip 45 is secured snugly around the depending rim of the film carriage 36 by insertion of the ends of the film strip through a transverse slot 47 in the rim of the film carriage.

The turntable 39 is revolved in a direction as shown by arrow 98 and preferably at substantially constant speed by means of shaft 37 through an appropriate keyed connection with the shaft represented at 48, in Fig. 5. Shaft 37 is revolved in either of two ways. That is, through a synchronous motor requiring manual starting and which involves a horizontally arranged toothed member 49 carried by shaft 37 which is aligned with electromagnets 50 and 51 which are electrically connected in parallel, and to a source of alternating current such as 110 volts, 60-cycle alternating current, connected to terminals 52. The electromagnets 50 and 51 are mounted on a support 53 fixed on a spacing pedestal 54 secured to the bottom of the camera case represented at 55. Power is supplied to the electromagnets 38 through slip rings 56 and 57, insulatingly mounted on shaft 37 and continuously wiped by brushes 58 and 59 which connect to a source of power at terminals 60. The electromagnets 38 serve as a means for locking the film carriage 36 to revolving turntable 39 as weight 3 is released and holding the film carriage 36 in position enabling the film carriage to be revolved nearly one revolution at which time release contacts 75 are opened by stop pin 74 on film carriage engaging elongated contact 76. The opening of release contacts 75 allows armature 72 and associated brake member 73 to engage pin 74 on film carriage and thus stop film carriage 36 in its original starting position. Removal and replacement of the film carriage is also facilitated when power is removed from electromagnets 38. The turntable 39 is formed by an inverted pan-like structure for supporting the circular row of electromagnets 38 constituting stick magnets with respect to the magnetic ring 40 on the film carriage 36. Turntable 39 and electromagnets 38 revolve at substantially constant speed and while de-energized the rotating electromagnets 38 slide on underside of magnetic strip 40 of film carriage 36 which is held in a stationary starting position by brake member 73 engaging stop pin 74.

In lieu of the synchronous motor drive constituted by toothed member 49 and electromagnets 50 and 51, I may employ a self-starting geared synchronous motor as represented in Figs. 9 and 10 where the motor is shown at 62, driving shaft 63, carrying pinion 64 which meshes with gear 65 carried by countershaft 66 journaled with respect to support 53 and driving pinion 67 which meshes with the toothed member 49.

The cam 35 mounted on the film carriage 36 may have various shapes for mounting different conditions of measurement encountered in the field in the particular area under investigation. Cam 35 is a correction device which corrects for reflections of the reflected elastic waves 4', 4a' and 4b' for certain known conditions in the area under investigation. Corrections can be made by the selection of a proper cam so that all corrected reflection times represent true vertical reflection times relative to reference time point 68 recorded on the film 45 at 69 and 70, for example, pursuant to energization of neon lamp 18 under control of pickup 5. Relay operating winding 20 controls both sets of contacts 19 comprising the circuit contacts to the neon lamp 18 and contacts 71 which are the holding contacts. The relay winding 20 operates armature member 72 having a brake member 73 thereon adapted to engage stop pin 74 carried by the depending rim of the film carriage 36. The control circuit also includes an arrangement of release contacts 75 carried by leaf springs one of which is elongated as represented at 76 and extends into the path of the pin 74 on the depending rim of the film carriage 36. The brake and release functions are arranged in the circuit as represented in Fig. 1 so that each cycle of operation may be completed as a timed sequence and there will be no overlapping of sequences. This arrangement permits multi-exposure of the same film on film carriage 36 on which reflected elastic waves which arrive consistently in time for each cycle of operation are photographically additive thus increasing the detectability of the reflected waves.

In a preferred form of the invention, the drop of weight 3 produces an elastic wave the reflections of which are utilized to determine characteristics of hidden bodies in the earth. Simultaneously with the production of the elastic wave, contacts 6 are closed and produce an electrical impulse at sound reproducer 9 which in turn produces a sound wave which travels through the delay hose 11 and emerges at the output of inductor generator 12 as a delayed electrical impulse. The time delay duration of the device 10 is a function of the length of the acoustic delay hose 11. Simultaneously with the closing of contacts 6, timing light 42, relay coil 20 and electromagnets 38 are energized by electric potential 7. The energizing of relay coil 20 releases film carriage 36 for rotation and the energizing of electromagnets 38 locks film carriage 36 to rotating turntable 39. By this arrangement film carriage 36 attains the rotating speed of turntable 39 almost instantaneously upon the close of contacts 6. The length of time required for the film carriage 36 to attain the speed of turntable 39 is repeatable within a small fraction of a millisecond. Energizing of timing light 42 registers time markers on film 45 through perforations 41 during rotation of film carriage 36. The known delayed electrical impulse is then impressed on neon light 18 through amplifier 14 and contacts 19 and hence on film strip 45 as transverse line 68 of Fig. 11. This recorded transverse line 68 is a known time reference point with respect to the instant of elastic wave generation by the impact of weight 3 and serves as a time reference point from which to measure the time of arrival of reflected waves such as 69 and 70 appearing at a later time on film record 45 of Fig. 11. The delay of the above mentioned electrical impulse should preferably be of sufficient duration to allow the recording of this impulse after the film carriage 36 has attained the rotational speed of turntable 39. Film carriage 36 is released by electromagnets 38 near the end of its recording cycle by the opening of release contacts 75 by pin 74 on the depending rim of film carriage 36 striking elongated contact member 76. The film carriage 36 is stopped in its original starting position, preparatory to the next weight drop, by brake member 73 engaging pin 74 subsequent to the de-energizing of relay coil 20 by the opening of release contacts 75. It will be understood that the purpose served by time delay device 10 is to allow the film carriage 36 to attain constant speed before the recording of the known delayed reference signal 68. As one alternative, a portion of the vertical fall time of the weight 3 may be used as a time delay. That is, contacts 6 may be closed at, near the beginning, or during the time of the weight fall and the film carriage 36 allowed to attain constant speed before impact of the weight 3 on earth 1. This impact is then recorded as reference point 68. This method of time delay, however, has the disadvantage of having to correct for possible variations in the time of weight fall.

In Fig. 4 I have shown the roller member 31 carried by lever arm 32 riding on the circular portion of the cam 35. The design of the cam 35 follows a law determined by the required correction for the reflection waves in the particular locality in which the equipment is being used. The cam most appropriate for such locality and the generally known conditions is selected for each particular investigation.

The roller member 31 which rides on the cam 35 is shown on a circular portion of the cam and does not cause movement of the neon lamp 18 and light slit 23 during the very early part of the recording regardless of the position of the adjustable pivot pin 28. The arrangement allows the known reference time delayed instant of elastic wave generation to be recorded in the same position of the film during successive multiexposure recordings on the same photographic film.

After the recording has progressed a short time the roller member 31 and hence the lever arm 32 takes a sharp dip to begin the time correction for reflections. When the weight 3 is dropped in close proximity to the pickup 5, very little correction is needed because all reflections travel a practically vertical path. In this position the adjustable pivot pin 28 is in a position almost directly under the neon lamp 18 and slit 23 so that very little lateral motion of the cam 35 is transferred to the neon lamp slit 23. As the weight 3 is dropped progressively outward from the pickup 5, the adjustable pivot pin 28, which acts as a variable multiplier of the cam motion, is moved progressively outward by turning the threaded screw 78, thus allowing more and more time correction to be made to compensate for increasing changes in geometric paths of reflections.

Longer reflection paths, caused by the weight 3 being dropped at progressively longer distances from the pickup 5 are compensated for by movement of the neon lamp slit 23 to record reflections on the same spot on the photographic film during successive multiexposure recordings. That is, reflections which arrive late due to longer paths are moved nearly an equal amount by movement of the neon lamp 18 and light slit 23 so that these reflections continuously arrive at the same spot on the multiexposed photographic film and their effect is additive. Random interference and random surface waves 97, however, are not additive.

With a series of weight drops a total of ¼ mile in length, greater corrections are needed for shallow reflections and relatively little corrections for reflections from depths in the order of 10,000 feet. The cam 35 is thus designed so that greater corrections are made during the early part of the record and these corrections gradually reduce as the recording progresses, so that toward the end of the recording relatively little correction is being made. These corrections are made by the cam 35 and are of sufficient accuracy to insure that reflections are substantially in phase so that their effect is additive on the multiexposed photographic film 45. It is preferred that the same values of correction used for the different weight drop positions relative to the pickup point be used throughout a survey so that the records may be more easily compared with one another in determining the characteristics of hidden deposits beneath the surface of the earth.

One procedure of applying corrections is to connect the wheel drive of the vehicle on which the equipment is mounted so that the pivot pin 28 in the camera is automatically moved as the vehicle is driven to various weight dropping points along the ¼ mile profile. Connections of pickup 5 with the camera may be made by radio or by an unwinding cable drum as the camera and weight 3 move progressively outward from the pickup position.

For depths to reflecting bodies approximately twice the drop profile distance and greater, it is sufficiently accurate to use a cam 35 designed to correct for reflections at the end or outermost position of the ¼ mile drop profile and use an adjustable pivot point 28 as described to make corrections for other paths within the drop profile distance.

Various lever arrangements may be used in conjunction with the cam 35 without altering the principle of invention. The type shown in the drawings is the simplest for illustrating the operation of the cam.

It is also possible to use a series of interchangeable cams of various designs. Each cam is designed for one weight drop position relative to the pickup device and used in conjunction with a stationary pivot point. This method would, however, lack the flexibility of the adjustable pivot point 28 which affords the equivalent of an infinite number of cams.

The base plate 25 rocks on its curved ends 25a and 25b within the opposite ends of frame 26 in which it is confined by transverse guide members 76 and 77 adjacent opposite ends of the frame 26. The pin 28 is advanced toward the center line of the neon lamp 18 or is retracted therefrom for changing the center about which base plate 25 moves through a micrometer screw adjustment mechanism represented at 78. The micrometer screw represented at 78 passes through the threaded frame structure 79 and is fastened to the upstanding end portion 29a of flat plate 29. The micrometer screw 78 is controlled by a remote gear drive as represented in Fig. 2 as comprising frame 80 in which there is journaled the shaft 81 operated by hand wheel 82 connected with the micrometer screw 78. The shaft 81 has a gear 83 thereon which drives the gear 84 journaled on countershaft 85 in frame 80. The countershaft 85 carries gear 86 which in turn meshes with gear 87 carried by shaft 88 journaled in frame 80. The face of gear 87 is calibrated as represented at 89, in Fig. 3. The peripheral face of gear 87 is observable through window 90 in frame structure 80 so that the precision setting of shaft 78 may be determined by reference to the calibrated scale indicated at 91 in window 90. Thus the position of pin 28 may be accurately advanced or retracted to various positions for varying the degree of lateral movement of neon lamp 18 and associated light slit 23 forward or backward with respect to the direction of movement of the film 45 in accordance with the necessary time corrections needed to correct for differences in time arrival of reflected waves so that their effect is additive on a multiexposed photographic film 45 as shown at 69 and 70. The relative positions of the light record reference point 68, and recorded reflections such as 69 and 70 relative to the timing marker records 46 provide the observer with the data required for interpreting the position or location and the magnitude of the deposits beneath the earth's surface.

The photo-sensitive portion of the equipment described herein is housed within a light-proof case 92 having a light-proof and dust-proof cover 93 hingedly connected therewith through suitable hinges 94. The case protects the film 45 against fogging from light and interchange of the film bands is made in a dark room or in a light-proof covering which may be worn by the operator in opening the hinged cover 93 and while making the film change. The case 92 is provided with light-tight openings for the passage of control shaft 78 and is provided with electrical service receptacles through which power may be brought into the light-tight case.

The effect of inertia on the sudden starting of the film carriage 36 and the effect of possible variations in release time of the film carriage is reduced by the arrangement of strips 61 carried by the magnetic ring 40 and which fit over the spoked portion of the film carriage 36 which is torsionally retained in position against stops 99 by means of springs indicated at 95 in Fig. 4. These springs 95 permit relative rotational movement between the magnetic ring 40 and film carriage 36 when the springs are stretched by the effect of starting inertia of the film carriage. By this arrangement the sudden gripping of magnetic ring 40 by revolving electromagnets 38 causes the springs 95 to stretch until such time as the film carriage 36 is released and overcomes the effect of starting inertia. The springs then act to return the magnetic ring 40 and film carriage 36 to their original relative positions. It is preferred that the above spring action be completed before the recording of the delayed time reference point 68 as previously described.

Since turntable 39 revolves at constant speed, film carriage 36 when magnetically locked to the turntable also revolves at constant speed. By dividing the rim of the film carriage into perforated timing segments these segments represent time intervals dependent upon the number of segments and the value of speed of rotation selected. By selecting a suitable rotational speed and by perforating the proper number of timing holes or slits in the film carriage the distance between the timing perforations may be made equal to $\frac{1}{100}$ second or some other convenient time interval for the speed of rotation selected.

It is possible to produce all timing lines at one time. In the case in which the film is rotated it is convenient to use a small light source near the inside rim to expose the timing lines on the film without the danger of fogging the entire film.

One of the advantages of my invention lies in the control of the recorder by the elastic source. Previous methods utilize the control of elastic source by the recorder which gives rise to a great many difficulties in the case of the weight-dropping technique. If the recorder is used to control the release of the weight, that is elastic energy, various factors such as release time errors, variation in height of fall must be accounted for. In the present invention all of these difficulties are eliminated since the action of the recorder is under control of the initiation of the elastic source. In order for this to be accomplished it is necessary to have a recorder capable of very high instantaneous starting. Heretofore a mechanical recorder capable of high instantaneous starting by control of an external source has not been achieved. The advantages of a high speed starting recorder are obvious when viewed in the relation to the integration of directly recorded records, that is, the direct compositing of recordings without the use of subsequent analyzer systems as used in previous methods.

None of the previous recording devices are capable of use in a direct integrating or compositing system under control of the initiation of the elastic energy source. Systems utilizing the recorder as the controlling element do not possess the requirements of a direct integrating or compositing recorder, that is, one not requiring subsequent analyzing equipment to make composite records.

The adjustments of phase-time corrections as shown by others are parts of analyzer systems. The method used in my invention for phase-time corrections is part of a direct recording integrating or compositing method.

The result produced by my invention differs from others in that the record produced by my invention is a directly integrated or composited record produced under control of the initiation of the elastic energy source. Previous recorders control the initiation of the elastic energy source and are not capable of or intended for producing directly integrated or composited records. These methods utilize the principle of an elastic energy source controlled by a recorder. In these systems if the elastic energy source were used to control the recorder they would become unworkable since they do not incorporate the principle of a high starting speed recorder in conjunction with a method of determining starting delay. The use of a recorder under control of the initiation of the elastic energy source is a decided advantage when utilizing methods such as the weight-drop method where it is advantageous to directly integrate several records into a composite record for the purpose of reinforcing the recording of reflected energy. By the use of this method it is not necessary to align time records as in the case of others where records are aligned before integration in an analyzer system. In fact no analyzer is necssary in that the recorder is a direct integrating or compositing system. This is a very substantial advantage when considering the time and expense of adjusting initial records in an analyzer system.

A new result produced by my invention is that of a directly integrated or composited record eliminating recording methods. However, records may be further analyzed if desired by various analyzer methods well known to the art. Also, since the recorder is controlled by the impact of the weight, a new result is the elimination of errors due to variable time of weight release and variable time of weight fall prevalent in other systems.

If desired the variable density film records produced by the recorder may be scanned by suitable photoelectric equipment and conventional amplitude seismic records obtained.

The photographic recorder herein described may be converted into a magnetic recorder by the use of a magnetic recording medium in lieu of film 45 in conjunction with suitable magnetic recording means. The photographic recorder herein described also may be operated with a suitably mounted film which is scanned by a driven recording lamp. For example, a recording lamp may be mounted on rim 36a in a manner so as to allow the scanning of a suitably mounted film by the recording lamp during rotation of the rim 36a.

I have found the system of my invention highly practical and precise in its operation and while I have described my invention in certain of its preferred embodiments, I realize that modifications may be made and I desire that it be understood that no limitations upon my invention are intended other than may be imposed by the scope of the appended claims.

What I claim as new and desire to secure by Letters Patent of the United States is as follows:

1. A photographic recorder comprising a rotatably driven shaft, a cylindrical drum driven by said shaft, a light sensitive film adapted to be mounted on said cylindrical drum, a cam mounted on said shaft adjacent the end of said cylindrical drum, a base structure having a pair of parallel extending guide rails mounted in a horizontal plane adjacent one side of said drum and terminating adjacent the light sensitive film mounted on said drum, a horizontally movable plate slidably disposed with respect to said guide rails, said plate having an abutment at each end thereof, a base plate terminating in rounded surfaces at each end thereof and disposed between and bearing upon the said abutments at each end thereof, said base plate having a central longitudinally extending slot therein, a pivot pin carried by said movable plate and projecting through the slot in said base plate, whereby said base plate is orientatable between the end abutments of said movable plate about said pivot pin as a fulcrum, a light discharge tube carried by said base plate, a light-housing having a light-slit therein surrounding said light discharge tube and mounted adjacent said drum with the light-slit directed toward the light sensitive film on said drum, means extending from the forward end of said base plate into the path of said cam, a cam follower carried by said means and engaging the surface of said cam, and means connecting the opposite end of said base plate with said movable plate for biasing said base plate to a position in which said cam follower is urged into engagement with said cam whereby movement of said cam effects displacement of said base plate, said light discharge tube, said light-housing, and said slit about said pivot pin as a fulcrum for predetermining the exposure path of said light sensitive film to said light discharge tube through said light-slit.

2. A photographic recorder as set forth in claim 1 including means carried by said base structure and adjustably connected with said horizontally movable plate for advancing or retracting said horizontally movable plate toward or away from said cylindrical drum.

3. A photographic recorder as set forth in claim 1 in which the means extending from the forward end of said base plate into the path of said cam is a lever connected through Y-shaped bracket arms with the forward end of said base plate.

4. A photographic recorder as set forth in claim 1 in which there are means connected between said base structure and said horizontally movable plate for urging said light-housing with the light-slit therein toward said light sensitive film on said drum.

5. A photographic recorder as set forth in claim 1 in which said means connecting the opposite end of said base plate with said movable plate is a coil spring which tends to move said base plate in a counterclockwise direction about said pivot pin.

6. A photographic recorder as set forth in claim 1 in which there is a manually operated crank mechanism connected with a rotatable screw mounted in said base structure, said screw being connected at the end thereof with the end of said movable plate for advancing and retracting said movable plate with respect to the light sensitive film of said drum.

7. A photographic recorder comprising a rotatably driven shaft, a cylindrical drum driven by said shaft, a light sensitive film adapted to be mounted on said cylindrical drum, a base plate, means to mount the base plate for pivotal movement adjacent said drum, a light discharge tube mounted on said base plate, a light-housing and associated light-slit enclosing said tube on said base plate and focussing light on said light sensitive film, a cam on said shaft, and means controlled by said cam for effecting a scanning movement of said base plate, and said light-housing and the associated light-slit, with respect to said light sensitive film.

8. A photographic recorder as set forth in claim 7 in which there are means operative for exciting said light discharge tube to luminousity for effecting a recording on said light sensitive film according to the initiation and receipt of seismic signals.

9. A photographic recorder comprising a rotatably driven shaft, driving means for said shaft, a cylindrical drum driven by said shaft, a light sensitive film adapted to be mounted on said cylindrical drum, a cam mounted on said shaft adjacent the end of said cylindrical drum, a base structure having a pair of parallel extending guide rails mounted in a horizontal plane adjacent one side of said drum and terminating adjacent the light sensitive film mounted on said drum, a horizontally movable plate slidably disposed with respect to said guide rails, said plate having an abutment at each end thereof, a base plate terminating in rounded surfaces at each end thereof and disposed between and bearing upon the said abutments at each end thereof, said base plate having a central longitudinally extending slot therein, a pivot pin carried by said movable plate and projecting through the slot in said base plate, whereby said base plate is orientatable between the end abutments of said movable plate about said pivot pin as a fulcrum, a light discharge tube carried by said base plate, a light-housing having a light-slit therein surrounding said light discharge tube and mounted adjacent said drum with the light-slit directed toward the light sensitive film on said drum, means extending from the forward end of said base plate into the path of said cam, a cam follower carried by said means and engaging the surface of said cam, means connecting the opposite end of said base plate with said movable plate for biasing said base plate to a position in which said cam follower is urged into engagement with said cam whereby movement of said cam effects displacement of said base plate, said light discharge tube, said light-housing, and said slit, about said pivot pin as a fulcrum for predetermining the exposure path of said light sensitive film to said light discharge tube through said light-slit, and time delay means connected to said light discharge tube and operable to energize said light discharge tube when said cylindrical drum driven by said shaft and said driving means has obtained a predetermined speed.

References Cited in the file of this patent

UNITED STATES PATENTS

| | | |
|---|---|---|
| 2,051,153 | Rieber | Aug. 18, 1936 |
| 2,243,730 | Ellis | May 27, 1941 |
| 2,275,735 | Cloud | Mar. 10, 1942 |
| 2,340,272 | McCarty | Jan. 25, 1944 |
| 2,440,971 | Palmer | May 4, 1948 |
| 2,604,955 | Hawkins | July 7, 1952 |
| 2,671,375 | Boucher | Mar. 9, 1954 |
| 2,732,025 | Lee | Jan. 24, 1956 |
| 2,765,455 | Meiners | Oct. 2, 1956 |
| 2,766,837 | McCollum | Oct. 16, 1956 |
| 2,795,287 | Sharpe | June 11, 1957 |
| 2,846,661 | Cunningham | Aug. 5, 1958 |
| 2,849,076 | Kaufman | Aug. 26, 1958 |
| 2,851,121 | McCollum | Sept. 9, 1958 |
| 2,851,122 | McCollum | Sept. 9, 1958 |